United States Patent
Dimino, Jr. et al.

(10) Patent No.: US 10,282,682 B2
(45) Date of Patent: May 7, 2019

(54) SYSTEMS AND METHODS FOR ASSIGNMENT OF EQUIPMENT TO AN OFFICER

(71) Applicant: Axon Enterprise, Inc., Scottsdale, AZ (US)

(72) Inventors: Joseph Charles Dimino, Jr., Seattle, WA (US); Michelle Joanne Guarino, Seattle, WA (US); Gabriel Joseph Othman, Seattle, WA (US); Tyler J. Conant, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 15/677,743

(22) Filed: Aug. 15, 2017

(65) Prior Publication Data
US 2018/0060766 A1 Mar. 1, 2018

Related U.S. Application Data

(60) Provisional application No. 62/380,943, filed on Aug. 29, 2016.

(51) Int. Cl.
*G08B 1/08* (2006.01)
*G06Q 10/06* (2012.01)
(Continued)

(52) U.S. Cl.
CPC .......... *G06Q 10/06* (2013.01); *B60R 25/102* (2013.01); *H04W 4/80* (2018.02); *H04W 12/08* (2013.01);
(Continued)

(58) Field of Classification Search
CPC ........ G06Q 10/06; B60R 25/102; H04B 5/00; G08B 1/08
See application file for complete search history.

(56) References Cited

U.S. PATENT DOCUMENTS

2007/0250411 A1* 10/2007 Williams ............. G06Q 10/087 705/28
2009/0150980 A1* 6/2009 Smith ................ G07C 9/00158 726/5

(Continued)

FOREIGN PATENT DOCUMENTS

JP 2008021150 A 1/2008
JP 5857276 B1 2/2016
(Continued)

OTHER PUBLICATIONS

International Searching Authority, International Search Report for the International Patent Application No. PCTUS2017/047171 dated Feb. 1, 2018.

*Primary Examiner* — Phung Nguyen
(74) *Attorney, Agent, or Firm* — Letham Law Firm

(57) ABSTRACT

A system for tracking, assigning, and issuing equipment to security agency personnel (e.g., officers, administration, command, armorer). An armorer is assigned the task of tracking, assigning, and issuing equipment. Equipment may be assigned to a particular individual officer. The equipment provided to and used by officers may capture (e.g. gather, produce) information (e.g. audiovisual information, data logs, recordings). Equipment may provide information to the armorer via near field communication (NFC) circuits. The information captured may be used alone or in combination with other information received and stored by an evidence management system. The information captured by equipment assigned to a particular individual may be associated with that individual. An armorer may use information supplied by equipment, evidence management system, officers, or other sources to assist in the assignment process.

17 Claims, 5 Drawing Sheets

(51) Int. Cl.
   *B60R 25/102*   (2013.01)
   *H04W 12/08*   (2009.01)
   *H04W 4/80*   (2018.01)
   *G08B 25/10*   (2006.01)
   *H04B 5/00*   (2006.01)
   *H04L 29/08*   (2006.01)

(52) U.S. Cl.
   CPC ............ *G08B 25/10* (2013.01); *H04B 5/0031* (2013.01); *H04L 29/08567* (2013.01); *Y04S 10/54* (2013.01)

(56) References Cited

U.S. PATENT DOCUMENTS

2015/0209676 A1    7/2015   Tsuchiya et al.
   2016/0098581 A1*   4/2016   Mart Ascencio ...... G06Q 10/00
                                                   340/5.82

FOREIGN PATENT DOCUMENTS

JP    2002007552 A    6/2016
   WO   2016103610 A1   6/2016

* cited by examiner

SYSTEMS AND METHODS FOR ASSIGNMENT OF EQUIPMENT TO AN OFFICER

FIELD OF THE INVENTION

Embodiments of the present invention relate to a system for tracking, assigning, and issuing equipment to officers.

BRIEF DESCRIPTION OF THE SEVERAL VIEWS OF THE DRAWING

Embodiments of the present invention will be described with reference to the drawing, wherein like designations denote like elements, and.

Figure 1:
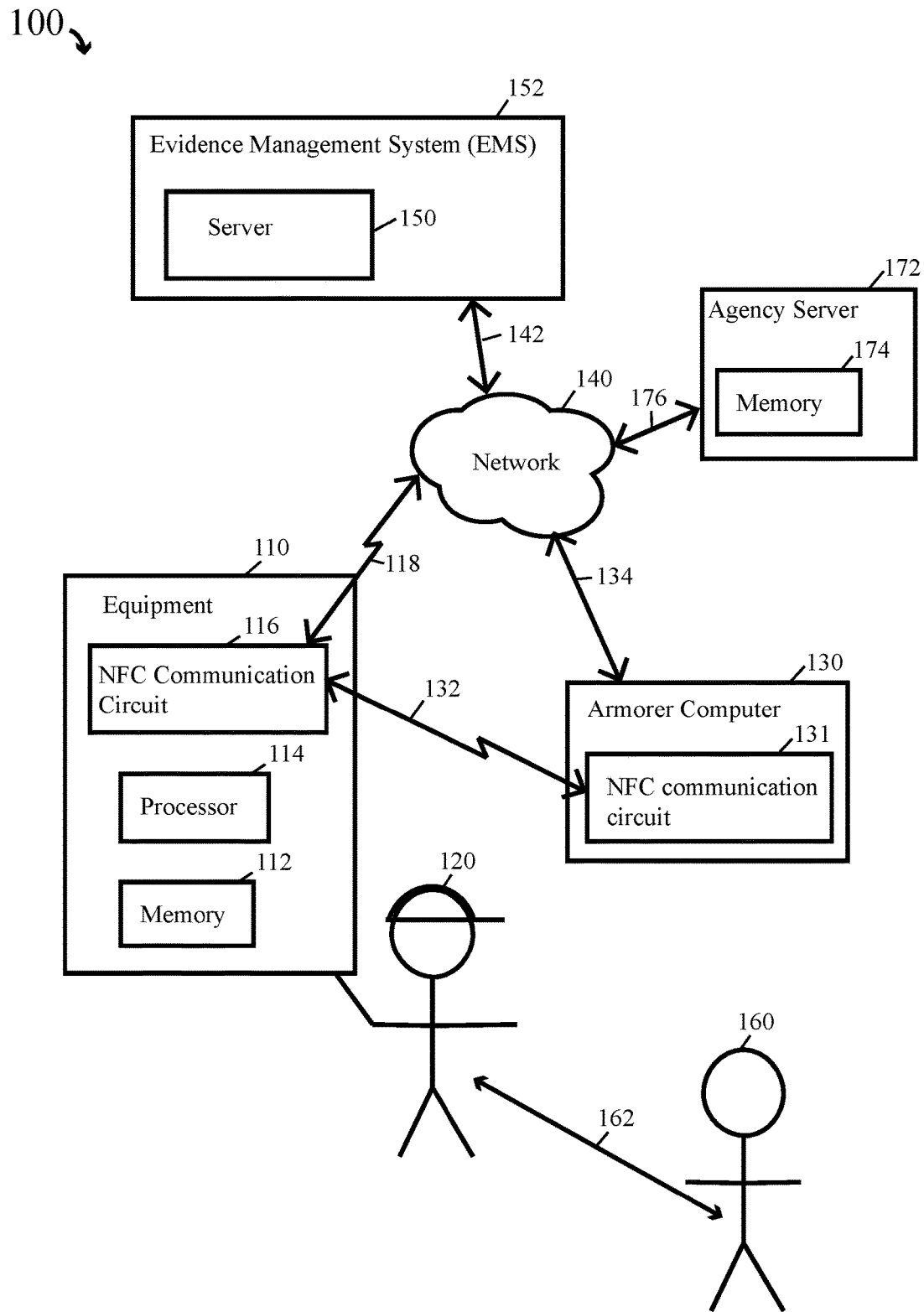
FIG. 1 is a functional block diagram of a system for tracking, assigning, and issuing equipment to an officer according to various aspects of the present invention.

The numerical designators in the drawing indicate the following: 100: assignment system, 110: equipment, 112: memory, 114: processor, 116: NFC communication circuit, 118: communication link, 120: armorer, 130: armorer computer, 131: NFC communication circuit, 140: network, 142: communication link, 150: server, 152: evidence management system, 160: agency officer, 162: communication, 172: agency server, 174: memory, 176: communication link, 200: assignment sequence, 210: process, 212: message, 214: message, 220: process, 222: message, 224: message, 230: process, 232: message, 234: message, 250: submission sequence, 252: message, 300: server, 310: communication circuit, 320: processing circuit, 330: memory, 340: instructions, 350: agency, 352: agency, 354: agency, 360: video information, 362: recording device log information, 364: CEW log information, 366: inventory information, 368: agency personnel, 370: assignment information, 400: method, 410: receive, 412: request, 414: receive, 416: instruct, 418: next, 420: detect, 422: request identifier, 424: receive identifier, 426: identification, 428: match, 430: time, 432: issue, 434: completion, 436: end, 438: fault, 440: limit, 500: armorer computer, 510: communication circuit, 520: processing circuit, 530: memory, 540: NFC interface, 550: user interface, 560: instructions, 562: personnel information, 564: equipment identifiers, 566: armorer information, and 568: equipment inventory.

DETAILED DESCRIPTION OF INVENTION

A security agency provides security to and administers the laws of a jurisdiction. A security agency may include personnel (e.g., officers, administration, command). Some personnel of an agency may patrol an area, respond to calls for help from the populous, apprehend people who break the law, and investigate crimes. A security agency may issue equipment for performing the functions of the security agency. Equipment that may be issued to agency personnel include guns, CEWs, recording devices (e.g. cameras, infrared camera, microphones, GPS receiver, electronic compass, electronic gyroscope), holsters, radios, vehicular computers, smartphones, cellphones, and other devices for providing security.

The process of tracking, assigning, and issuing equipment to agency personnel is laborious and time-consuming. Further, linking information (e.g., data) produced by equipment to an officer or to particular equipment makes the process of managing equipment even more difficult. It would be desirable to have a system for gathering information from various sources for tracking, assigning, and issuing equipment.

The system of FIG. 1 is an example of a system that tracks, assigns, and issues equipment. The system of FIG. 1 further receives data from equipment and links (e.g., ties, correlates) the information to an officer and/or the specific equipment. Assignment system 100 performs the functions of a system that tracks, assigns, and issues equipment, and links data from equipment. Assignment system 100 includes equipment 110, armorer 120, armorer computer 130 (also referred to as computer 130), network 140, server 150, evidence management system 152, agency officer 160, and agency server 172.

The components of assignment system 100 may communicate with each other to track, and assign equipment. Assignment system 100 may further receive data from equipment, store the data, and associate the data to equipment and the officer to whom the equipment is issued.

An evidence management system receives, provides, manages, and/or stores evidence. An evidence management system may store evidence for a security agency. Evidence may include information stored and/or manipulated in digital form. Evidence may include audiovisual information and/or information from a CEW, a deployment unit, a holster, a vehicle, or other equipment. Evidence may be stored on servers and accessed via a network. An evidence management system may include a server to perform the functions of an evidence management system For example, evidence management system 152 performs the functions of an evidence management system. Evidence management system 152 may include server 150. Server 150 may perform some or all of the functions of evidence management system 152. Server 150 may control other electronic devices to perform the functions of evidence management system 152.

A network enables electronic communications between electronic devices. Electronic device may exchange data (e.g., information) via a network. A network may include nodes. Data may be transferred between nodes. A communication link (e.g., data link) permits the transfer of information between nodes of the network. A communication link may include a wired or wireless connection. A node of a network may include electronic devices such as a server, a tablet device, a portable computer and/or mobile data terminal in a vehicle. An electronic device, including a server, may provide and/or receive data via other nodes and communication links of the network.

For example, evidence management system 152, armorer computer 130, server 172, and equipment 110 may perform the functions of a node. Communications links may include communication links 118, 142, and 176.

Near field communication (NFC) is a method of short-range wireless communication. Two devices with NFC communications circuits may communicate with each other via an NFC commination link when the devices are brought into close proximity (e.g. a range of approximately 2 inches) of each other. Equipment may include an NFC communication circuit to assist a process for assigning the equipment. Equipment may further include a processing circuit and a memory. For example, equipment 110 may include memory 112, processor 114, and NFC communication circuit 116. Equipment 110 may communicate with network 140 via communication link 118. Equipment 110 may further communicate with armorer computer 130 via communication link 132.

Agency server 172 may provide information and perform functions to aid a security agency in performing its functions as discussed above. Agency server 172 may include memory 174. Server 172 may gather, store, provide information related to the agency and the personnel associated with the agency. Server 172 may communicate with network 140 via communication link 176.

Agency officer 160 may include personnel of an agency as discussed above.

An armorer is a member of the agency's personnel. An armorer is assigned the task of tracking, assigning, and issuing equipment. An armorer may track equipment of an agency. An armorer may assign and issue equipment to members of the agency, such as to officers of the agency. An armorer may visually verify the identity of officer prior to issuing equipment to the officer. For example, armorer 120 may communicate with officer 160. Communication 162 may include verifying identification. For example, armorer 120 may ask officer 160 to provide identification. Armorer 120 may compare a photograph on the identification information provided by officer 160 to officer 160 in person to verify the identity of officer 160. Armorer 120 may compare officer 160 while present in person to a photograph provided by the agency.

An armorer may use a computer to track, assign, and issue equipment. The computer used by an armorer may include an NFC communication circuit. The NFC communication circuit of the computer used by the armorer may communicate with the NFC communication circuit of equipment. The NFC communication circuit of the computer used by the armorer may identify equipment. An NFC communication circuit may receive an identification number to identify equipment. The identification number may include a unique serial number. For example, armorer computer 130 may include NFC communication circuit 131. Armorer computer 130 may communicate with equipment via communication link 132.

The computer used by the armorer may request data regarding personnel of the agency. Data related to personnel at an agency may include unique identifiers (e.g., employee number, badge number, personnel number) for each person. Data related to personnel at an agency may include a description of the role of each person at the agency. The data for each person at the agency may be used to identify the person, to determine the type of equipment that should be issued to the person, and whether equipment has been previously issued equipment.

Equipment may capture (e.g., gather, produce) information (e.g., data logs, recordings). Information captured by equipment may be transmitted to an evidence management system. The information captured by equipment assigned to a particular individual may be associated with that individual. The information captured by equipment assigned to a particular individual may be associated the agency of the individual. An evidence management system may associate the information captured by equipment to the individual to whom the equipment is assigned and/or the agency to which the individual belongs. An evidence management system may associate the serial number of equipment to the personnel number of a user.

Figure 3:
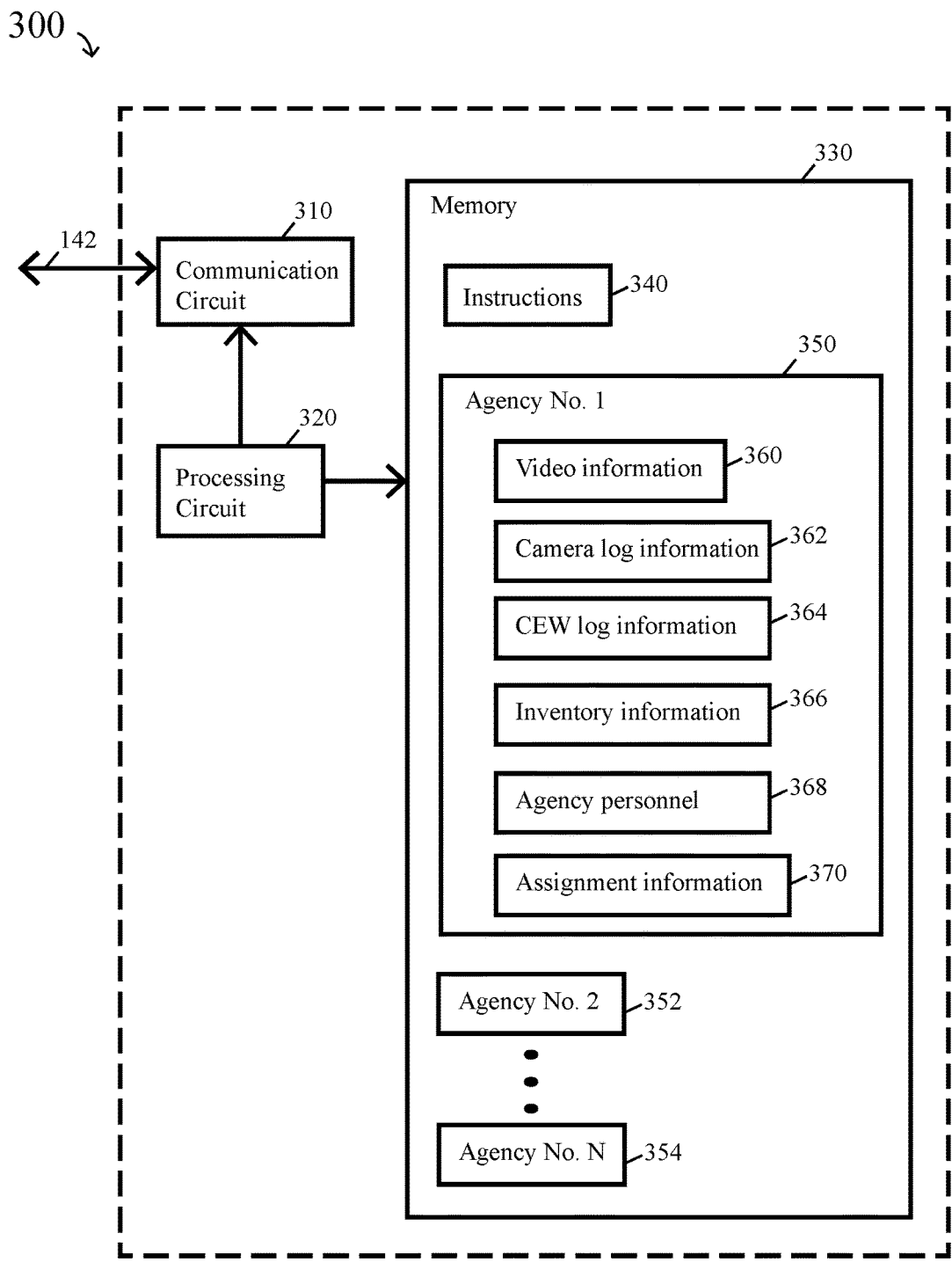
FIG. 3 is functional block diagram of the server of an evidence management system as depicted in FIG. 1.
Figure 4:
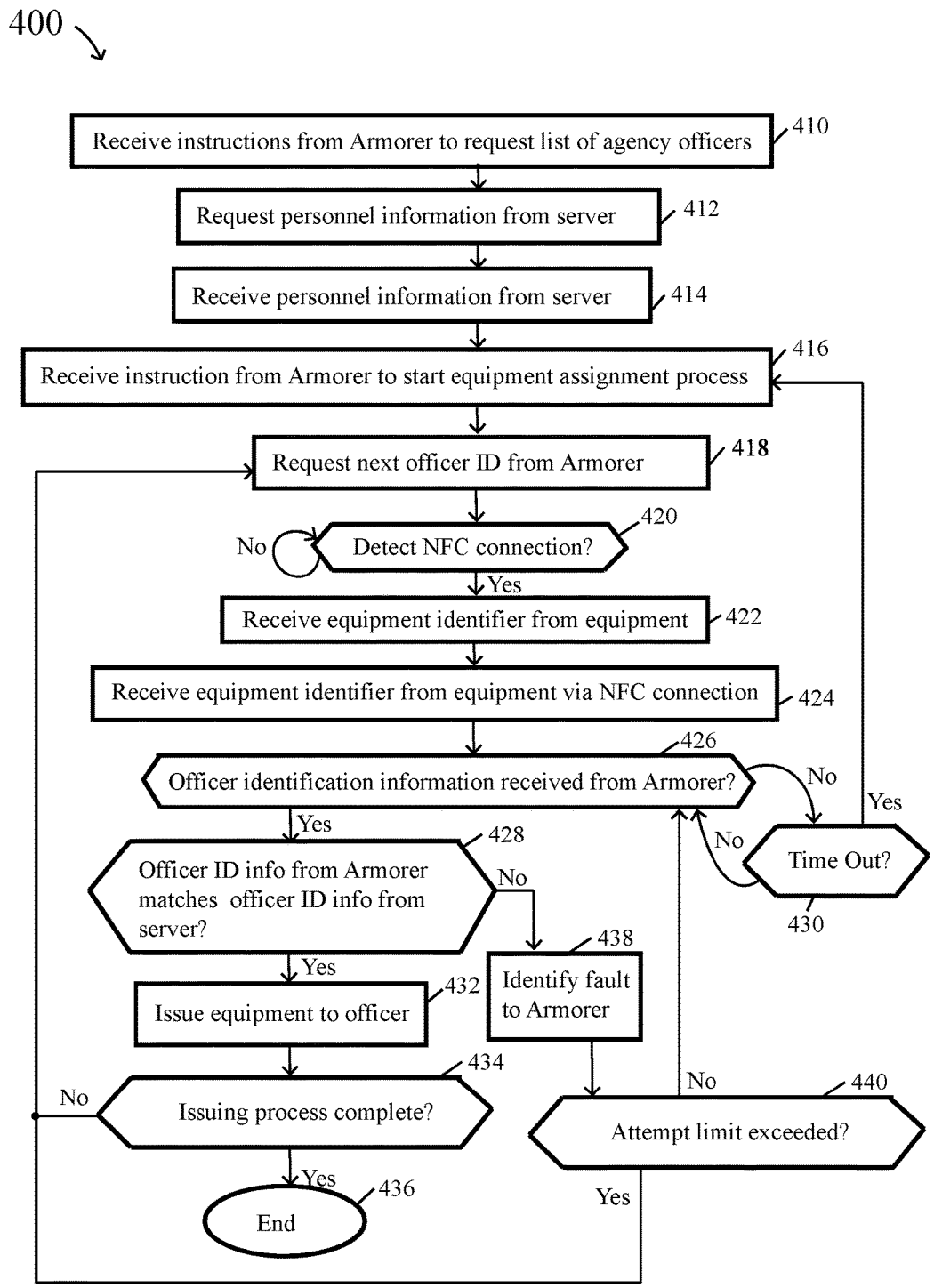
FIG. 4 is a flow chart of a method for assigning and issuing equipment to officers.
Figure 5:
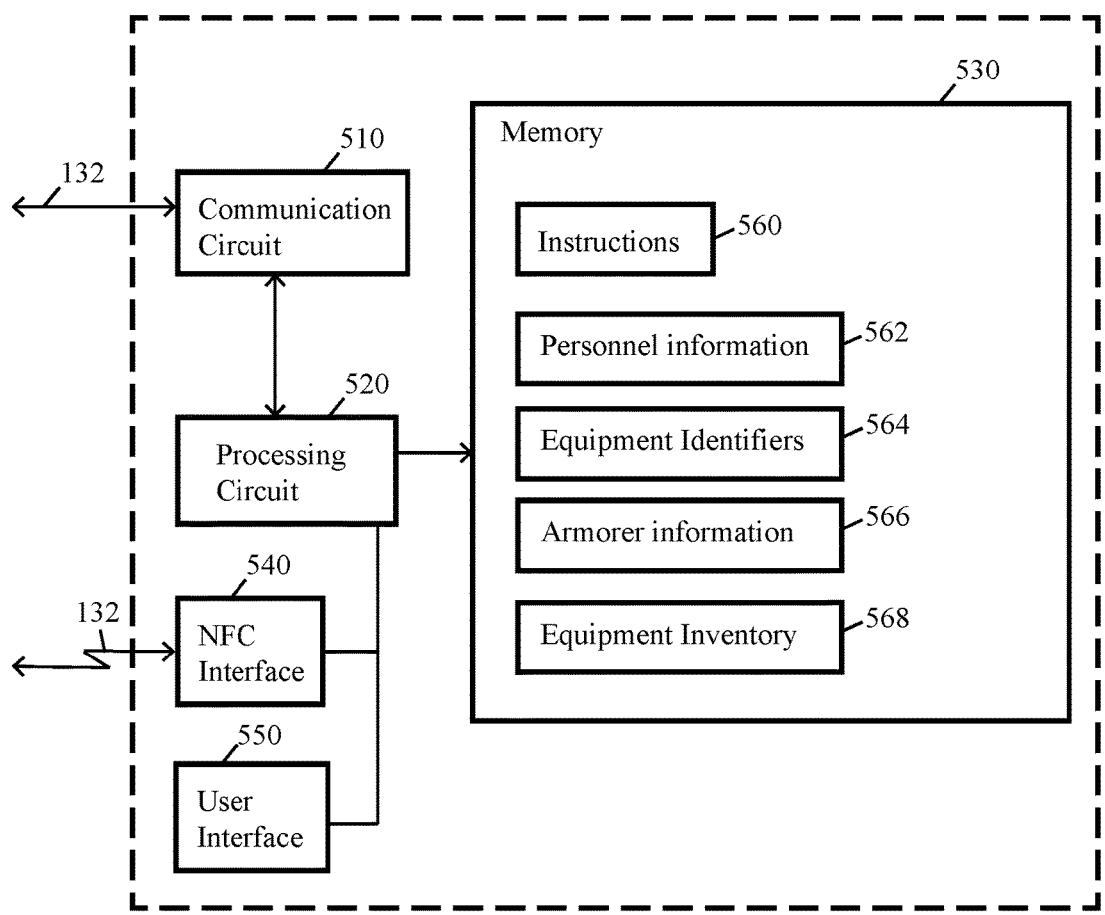
FIG. 5 is a functional block diagram of a computer used by an armorer to assign equipment to officers.

Server 300 of FIG. 3 in an implementation of server 150 of evidence management system 152. Server 300 may perform the functions of server 150 discussed herein. Server 300 may include communication circuit 310, processing circuit 320, and memory 330. Memory 330 may include data structures for storing instructions 340 and information for various agencies 350 through 354. Processing circuit 320 may read and execute instructions 340 to perform some or all of the functions of server 150/300 and evidence management system 152. Communication circuit 310, processing circuit 320, memory 330, and evidence management system 152 may perform the functions of a communication circuit, a processing circuit, a memory, and an evidence management system respectively as discussed herein.

Information stored in the data structure for each agency (e.g. agency 350, agency 352, agency 354) in memory 330 may include video information 360, recording device log information 362, CEW log information 364, inventory information 366, agency personnel information 368, and equipment assignment information 370. Video information 360 may include video data captured by a recording device, whether carried by an officer or positioned in a vehicle. Recording device log information may include metadata about the captured data. Agency personnel information 368 may include identifiers of the personnel at the agency. Equipment assignment information 370 may include a data structure of all associations made between equipment information (e.g., equipment identifiers) and personnel information (e.g., personnel identifiers) Equipment information may further include an inventory of the equipment of the agency.

Computer 500 is an implementation of armorer' computer 130. Computer 500 may perform the functions of computer 130 discussed herein. Computer 500 may include communication circuit 510, processing circuit 520, memory 530, NFC interface 540, and user interface 550. Memory 530 may include data structures for storing instructions 560, personnel information 562 received from a server (e.g., server 150/300), equipment identifiers 564 received from equipment 110 via an NFC communication link, armorer provided information 566 regarding equipment and personal as received (e.g., visual inspection) by the armorer, and equipment inventory 568 provided by agency server 172 or evidence management system 152. Communication circuit 510, processing circuit 520, memory 530, NFC interface 540, and user interface 550 perform the functions of a communication circuit, a processing circuit, a memory, an NFC interface, and a user interface as discussed herein.

Agency server 172 may include some or all of the circuits and memory of server 300 and/or computer 500. For example, agency server 172 may include communication circuit 510, processing circuit 520, user interface 550, and memory 530. Memory of agency server 172 may store such information as personnel information, equipment identifiers, armorer information, and equipment inventory.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. A processing circuit may cooperate with a memory to store and/or retrieve information. Information received, stored, and/or manipulated by the processing circuit may be used to perform a function, control a function, and/or to execute a stored program.

A processing circuit may control the operation and/or function of other circuits and/or components of a system. A processing circuit may receive status information regarding the operation of other components of a system, perform calculations with respect to status information, and provide commands (e.g., instructions) to one or more other components for the component to start operation, continue operation, alter operation, suspend operation, or cease operation.

In an implementation, processing circuit 320 acts in cooperation with communication circuit 310 to receive and transmit information via the network. Information which may be manipulated and/or transmitted by the processor includes agency information stored in memory 330 such as inventory, agent personnel and assignment information.

In an implementation, processing circuit 520 cooperates with communication circuit 510 and NFC interface 540 in order to receive and transmit information. Information retrieved via the network may be processed through communication circuit 510 and information provided by equipment may be processed through NFC connection. Information which may be manipulated and/or transmitted by processing circuit 520 includes equipment identifiers, personnel information, armorer information and inventory.

The functions performed by a server may be performed by an engine. The term "engine" as used herein refers to, in general, circuitry, logic embodied in hardware and/or software instructions executable by a processing circuit, such as processing circuit 320. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA™, PHP, Perl, HTML, CSS, JavaScript, VBScript, ASPX, HDL, and/or Microsoft.NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

The devices and systems illustrated herein may include one or more processing circuits configured to perform the functions of one or more engines.

In an implementation of server 150/300, a combination of one or more of processing circuit 320, communication circuit 310, and memory 330 may cooperate to perform the functions of an engine. Functions performed by a server of an evidence management system may include receiving data from an agency server, receiving data regarding associations between equipment and personnel from an armorer computer. Functions of receiving data may be performed by an engine on server 150.

Armorer computer 500 may include engines that perform one or more functions of the armorer computer. For example, an engine may perform method 400. Communication circuit 510, processing circuit 520, memory 530, NFC interface 540 and user interface 550 may cooperate to perform the functions of such an engine.

A memory may store instructions and data for a processing circuit. A processing circuit may include an integrated (e.g., internal) memory. A memory may be separate from a processing circuit. The contents of a memory may be static (e.g., non-volatile, SRAM, flash). The contents of a memory may be dynamic (e.g., DRAM). A memory may include any conventional technology (e.g., solid-state, magnetoresistive, resistive, ferroelectric). A memory may store information in a structure manner such as in a data structure.

A memory may store data in an organized manner such as in a data structure. A memory that stores data may also be referred to as a data store. A memory that includes a data structure may operate as a data store.

As understood by one of ordinary skill in the art, a "data store" as described herein may be any suitable device configured to store data for access by a processing circuit. A data store receives data. A data store retains (e.g., stores) data. A data store retrieves data. A data store provides data for use by a system, such as an engine. A data store may organize data for storage.

A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in a system.

An example of a data store which includes reliable storage but also low overhead, is a file system or database management system that stores data in files (or records) on a computer-readable medium such as flash memory, random access memory (RAM), or hard disk drives.

One example of a data store suitable for use in server 172 and/or server 150/300 is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

Memory 330 and/or memory 530 may be implemented as a data store. The data shown in memory 330 and/or memory 530 may be stored in a database of a data store. For example, an association data store on server 150/300 may contain information associating officer identifiers with equipment serial numbers. A data store may be implemented using any computer-readable medium. An engine may access data stores locally (e.g., via data bus), over a network, and/or as a cloud-based service.

One of ordinary skill in the art will recognize that separate data stores may be combined into a single data store, and/or a single data store may be separated into multiple data stores.

A communication circuit transmits and/or receives information (e.g., data). A communication circuit may transmit and/or receive (e.g., communicate) information via a wireless link and/or a wired link. A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA) and/or wired (e.g., USB, RS-232, Firewire, Ethernet) communication protocols. A communication circuit may receive information from a processing circuit for transmission. A communication circuit may provide received information to a processing circuit.

A communication circuit in one device (e.g., armorer computer) may communicate with a communication circuit in another device (e.g., equipment). Communications between two devices may permit the two devices to cooperate in performing a function of either device.

In an implementation, communication circuit 310 and 510 communicate with other devices via network 140. In an implementation of server 172, server 172 includes a communication circuit for communicating with other devices via network 140.

A user interface may include one or more controls that permit a user to interact and/or communicate with an electronic device. Via a user interface, a user may control (e.g., influence, select) the operation (e.g., function) of an electronic device. A user interface may provide information to a user. A user may receive visual, haptic, and/or audible information from a user interface. A user may receive visual information via devices that visually display (e.g., present, show) information (e.g., LCDs, LEDs, light sources, graphical and/or textual display, display, monitor, touchscreen). A user interface may include a communication circuit for transmitting information to an electronic device (e.g., smart phone, tablet computer, laptop computer) for presentation to a user.

In an implementation, user interface 550 may be used by the armorer to provide or augment personnel identifiers during the assignment process. User interface 550 may include a keyboard and mouse combination, a computer or tablet display, or an electronic device for swiping officer ID cards and extracting the information thereof.

Equipment, an armorer's computer, and a server may perform functions and communicate with each other to assign the equipment to a user. The functions may be performed and the information that may be communicated between equipment 110, computer 130, server 150, and/or server 172 to assign equipment to a user is shown in assignment sequence 200 of FIG. 2.

The process of assigning equipment to users may begin with process 210 in which an armorer instructs computer 130 to request personnel identifiers for the personnel of the agency. Responsive to the instructions of process 210, computer 130 sends message 212 to server 150 to request agency personnel information, for example, agency personnel information 368. Personnel information may include includes personnel identifiers. Personnel identifiers may include badge number, social security number, employee number, picture, service record, rank, and whether particular equipment should be assigned. In another implementation, message 212 may be sent to server 172 to request personnel information.

Server 150 responds to message 212 by providing agency personnel information, such as agency personnel information 368. Agency personnel information may be provided via personnel response message 214. In the event that message 212 was sent to agency server 172, message 214 will be provided by agency server 172.

Upon receipt of message 214, computer 130 stores agency personnel information 368 in its memory. For example, computer 130 may store agency personnel information 368 in a data structure in memory 530 as personnel information 562.

An armorer may receive information from officer 160, as discussed above, to verify the identity of the officer. The information received by the armorer may be stored in memory 530 in personnel identifiers 562 or it may be stored in a different data structure.

Computer 130 may request and server 150/172 may send additional information to computer 130 such as inventory information 366, so that the armorer may have information as to the equipment that is available for assignment. The armorer may use inventory information 366 to verify that all of the equipment assigned is identified as belonging to the agency.

After the computer 130 receives information, process 220 may determine whether computer 130 detects an NFC connection (e.g., link) with equipment 110. Upon detection of a link, computer 130 may request the equipment to provide its serial number. The request for serial number may be sent via message 222. Equipment 110 may store information such as video information, audio information, data log, and/or a serial number in memory 112. Equipment 110 may transmit its serial number to computer 130 in message 224 via NFC link. Responsive to receiving the serial number, computer 130 may store the serial number from the equipment in memory as equipment identifiers 564.

The assignment process continues with process 230, during which computer 130 associates personnel identifiers previously received from server 150/172 with the serial number received from equipment 110. Computer 130 may further associate information received directly from officer 160 with the serial number received from equipment 110. Associations made by computer 130 are transmitted in message 232 to server 150 and stored in assignment information 370. Message 234 confirms receipt of the associations by server 150. The associations sent to the evidence management system may be used to associate video captured by a recording device that is assigned to an officer to the officer. The associations may be further sent to server 172; however, server 172 does not receive captured video, so server 172 does not associate video with a particular officer.

As discussed above, equipment 110 may include electronic devices (smartphones, cellphones), recording devices, guns, CEW's, radios, computers, and other devices. Equipment may store captured (e.g., recorded collected) evidence in memory 112. Evidence may include audiovisual information, data logs from CEW or gun, and other information captured in the course of equipment use. Evidence may be transmitted to server 150 for storage in the evidence management system.

Figure 2:
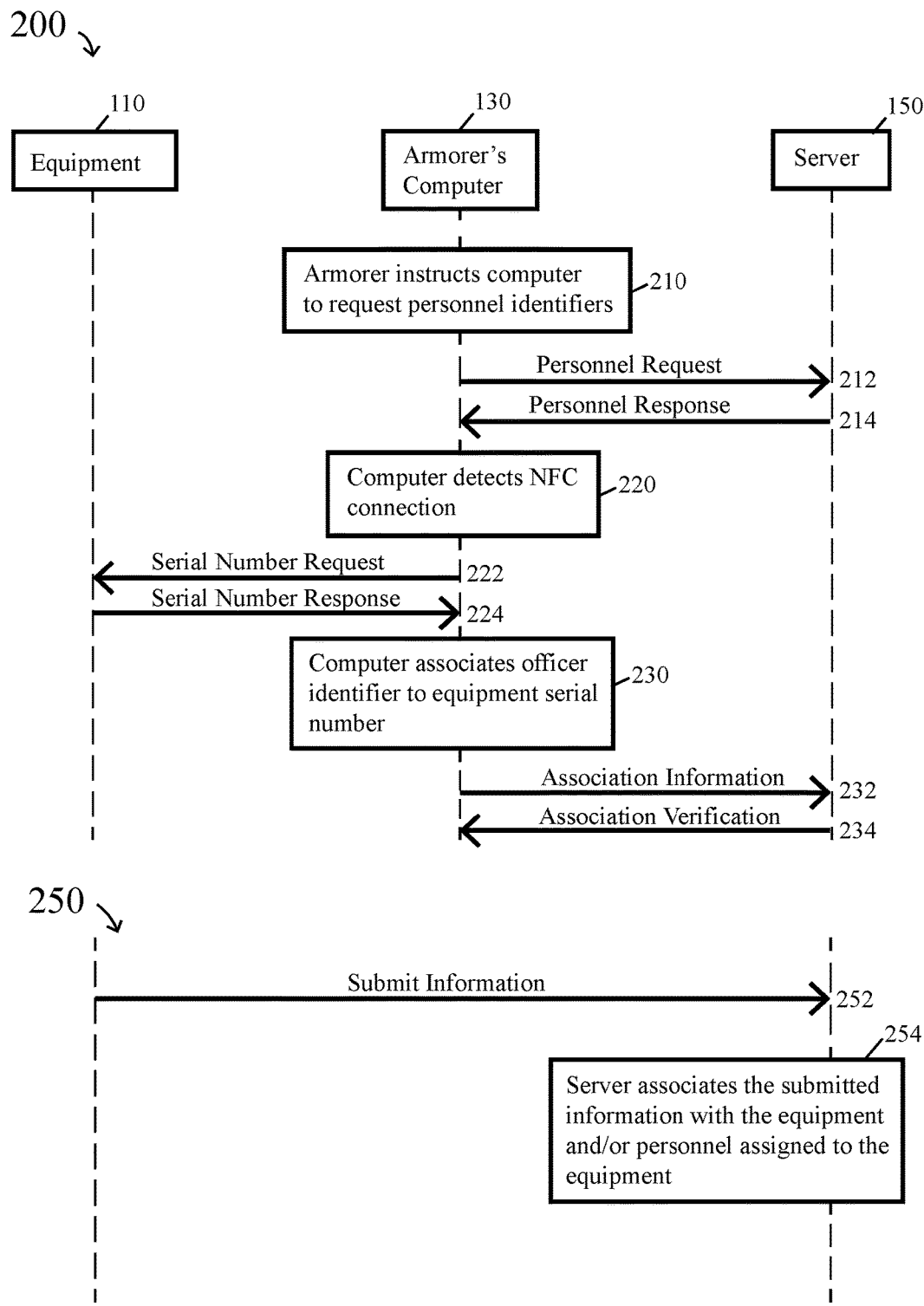
FIG. 2 is a sequence diagram of electronic messages communicated between computers and equipment for tracking, assigning, and issuing equipment to officers.

The process of submitting information to the evidence management system may begin with submission sequence 250 of FIG. 2. Evidence collected by equipment 110 is provided (e.g., submitted) to server 150 in one or more messages 252. Transmission of information may be accomplished by any standard wired or wireless communication protocol (e.g. Bluetooth, WiFi, 3G, 4G, and LTE). Responsive to receipt of the information in message 252, process 254 detects the serial number of the equipment that provided the captured information. Using the serial number of the captured information and the association information in equipment assignment information 370, server 150 may associate the submitted information with the equipment 110 and/or the personnel associated with equipment 110.

An implementation of a method for receiving information, providing information, and associating equipment with an officer is provided as method 400. The processing circuit of computer 130 may execute a series of instructions to perform method 400. The instructions may be stored in memory 530 as instructions 560. The processes (e.g., functions) of a method may be performed serially and/or in parallel. A process of a method may start execution upon receiving sufficient information to perform the function (e.g., operation) of the process. One process may produce (e.g., calculate, generate) information that may be provided to another process. Information may be provided between or to a process via a stack or other conventional manner for providing data. The order of many of the processes shown in method 400 may be changed and still accomplish the same result.

Method 400 may include processes receive 410, request 412, receive 414, instruct 416, next 418, detect 420, request identifier 422, receive identifier 424, identification 426, match 428, time 430, issue 432, completion 434, end 436, fault 438, limit 440.

Execution of receive 410 receives information and/or a command from an armorer. An armorer may provide the information and/or command via user interface 550. User interface may include any conventional equipment (e.g., keyboard, mouse, touch screen) for a user to provide information to a computer. The information and/or command received in process receive 410 instructs computer 130 to request personnel information from the server 150/300 of evidence management system 152 from agency server 172. Execution moves to request 412.

Execution of request 412 requests personnel information. Personnel information includes personnel identifiers stored in agency personnel information 368 on server 150/300 of evidence management system 152. Personnel information may also be stored on and provided by server 172. The message requesting the personnel information may be transmitted via network 140. Execution moves to receive 414.

Execution of receive 414 receives the personnel information from server 150/300 or server 172. The information received may be stored in personnel information 562 on the armorer's computer. Personnel information may be received via network 140. Execution moves to instruct 416.

Execution of instruct 416 receives an instruction from the armorer to start the equipment assignment process. The armorer may additionally provide security credentials or other passwords to start the assignment process. Execution moves to next 418.

Execution of next 418 requests the armorer to provide the personnel identifier of the next officer to be equipped. The armorer may receive the officer identifier by inputting manually, swiping an officer ID card, selecting the identifier from a downloaded (e.g. generated) list, or by other means. For security, the armorer may visually verify an officer's identity in the process of receiving the officer identifier. A personnel identifier may include one or more identifiers. Execution moves to detect 420.

Execution of detect 420 detects whether an NFC connection (e.g., link) between the equipment to be issued to the officer and the armorer's computer exists. In the event that an NFC link does not exist, detect 420 attempts to establish the link. If an NFC connection exists, execution moves to request identifier 422. If no NFC connection exists, execution loops back to detect 420 to attempt to establish the NFC link. Execution of detect 420 may attempt to establish the NFC link a predetermined number of times before determining that a link cannot be established. If a link cannot be established, computer 130/500 informs the armorer and takes an appropriate action. The assignment process may not proceed via an NFC until NFC connection is made. In an alternate method, the equipment identifier may be entered by the armorer into computer 130/500 manually.

Execution of request identifier 422 requests that the equipment identifier (e.g., serial number) of the equipment be transmitted by NFC to the armorer's computer. Equipment identifiers may be stored in memory 112 of the equipment. Execution moves to receive identifier 424.

Execution of receive identifier 424 receives the equipment identifier and stores it memory 530 of the armorer's computer in data structure equipment identifiers 564. Execution moves to identification 426.

Execution of identification 426 determines whether an officer identifier has been provided by the armorer. If an officer identifier has been received, execution moves to match 428. If an officer identifier has not been received, execution moves to time 430.

Execution of time 430 provides a waiting period that allows the armorer to input the personnel information. The waiting period prior to time-out may vary between agencies. The time-out is a security measure that may prevent unauthorized access to the assignment system at an unattended computer. Upon failure to provide the identifier, the assignment process times out and will restart with execution returning to instruct 416.

Execution of match 428 determines whether personnel information provided by the armorer matches personnel information provided by server 150/300 or server 172. If the personnel information submitted to the computer by the armorer matches the personnel information provided by the server, execution moves to issue 432. If the personnel information does not match any personnel information provided by the server, execution moves to fault 438.

Execution of issue 432 associates the personnel information with the equipment identifier. Associating the personnel information with the equipment identifier establishes that the officer has control of the equipment. Having control of the equipment by a single officer means that the data provided by the equipment is associated with the officer. As data from equipment is upload into evidence management system 152 (e.g., submission sequence 250), the data may be associated with the officer to whom the equipment was issued. The data may also be associated with the agency of the officer. The data from the equipment may be further associated with other data related to the officer and the time of day the data was captured. Additional data may be provided by a computer-aided dispatch system that dispatches officers to incidents and/or from a records management system that manages the records created with respect to the officer and/or an incident.

In the situation where equipment is shared by several officers, the issue process may be performed prior to starting a shift so that the data during the time duration of the shift may be associated with the officer to whom the equipment was issued for the shift.

Execution of issue 432 further instructs the armorer to issue the equipment to the officer. The armorer may physically issue the equipment or may issue permission for the officer to use the equipment. The armorer may issue equipment immediately or for retrieval at a specific date. Execution moves to completion 434.

Execution of completion 434 determines whether the issuing process has been completed. If all desired equipment has been issued, execution moves to end 436 where the issuing process concludes. If the armorer wishes to assign more equipment, execution loops back to next 418.

Execution of fault 438 identifies the mismatch between the personnel information provided by the armorer and the personnel information provided by the server to the armorer. Execution moves to limit 440.

Execution of limit 440 determines whether the permissible number of attempts for matching the armorer provided information to the server provided information has been exceeded. The maximum number of attempts may be put in place for security purposes and may differ between agencies. If the attempt limit has been exceeded, execution loops back to next 418. If the attempt limit has not been exceeded, execution returns to identification 426.

Execution of end 436 marks the end of the assignment process on the armorer's computer.

Once the assignment process has finish, the information that associates personnel information of a particular officer to equipment information of particular equipment is transferred to evidence management system 152. Evidence management system 152 may store the associate information in data structure 370 on server 150/300. The associations from data structure 370 may be used to associated data from equipment to an officer as discussed above.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A method performed by an electronic device to assign an equipment to a first person, the electronic device operated by a second person, the method comprising:
    responsive to an instruction received via a user interface of the electronic device, electronically requesting from a server a list of identifiers of members of an agency;
    responsive to the requesting, receiving the list of identifiers, the list includes a plurality of identifiers, each identifier identifies one member of the agency;
    presenting the list of identifiers on a display of the electronic device;
    receiving via near-field communication a serial number of the equipment; and
    responsive to a selection of one identifier from the list, assigning the serial number to the one identifier, the one identifier selected from the list via the user interface, the one identifier associated with the first person, whereby the equipment is assigned to the first person.

2. The method of claim 1 wherein requesting comprises transmitting a message, the message containing a request.

3. The method of claim 1 wherein receiving the list of identifiers comprises receiving a message from the server, the message includes the list of identifiers, the list of identifiers previously provided electronically to the server by the agency.

4. The method of claim 1 wherein receiving via near-field communication comprises positioning the equipment within a near-field communication range of the electronic device.

5. The method of claim 1 further comprising electronically transmitting an information regarding the assignment of the serial number to the one identifier to the server.

6. An electronic device for assigning a provided recording device to a first person, the electronic device operated by a second person, the electronic device comprising:
    a processing circuit;
    a near-field communication interface;
    a communication circuit; and
    a user interface; and
    a display wherein
        responsive to an instruction provided via the user interface, communication circuit transmits a request for a list of identifiers of members of an agency;
        responsive to the request, the communication circuit receives the list of identifiers, list includes a plurality of identifiers, each identifier identifies one member of the agency;
        the processing circuit presents the list of identifiers on the display;
        the near-field communication interface receives via near-field communication a serial number from the recording device; and
        responsive to a selection of one identifier from the list of identifiers, the processing circuit assigns the serial number from the recording device to the one identifier selected from the list via the user interface, the one identifier associated with the first person, whereby the recording device is assigned to the first person.

7. The electronic device of claim 6 wherein responsive to assignment of the serial number from the recording device to the one identifier selected from the list, the communication circuit transmits information regarding the assignment of the serial number from the recording device to the identifier selected from the list.

8. The electronic device of claim 6 wherein assignment of the serial number from the recording device to the one identifier selected from the list is used to associate data recorded by the recording device to the first person.

9. The electronic device of claim 6 wherein selection of the one identifier from the list via the user interface is responsive to visual verification of an identity of the first person by the second person.

10. The electronic device of claim 6 wherein selection of the one identifier from the list via the user interface is responsive to verification of an identity of the first person via swiping of an identification card of the first person.

11. The electronic device of claim 6 comprises one of a tablet, a smart phone; and a computer.

12. The electronic device of claim 6 wherein the one identifier selected from the list corresponds to at least one of a badge number, a social security number, and a photograph.

13. A system for assigning a provided recording device to a first person and associating a recorded data captured by the recording device with the first person, the system comprising:

an electronic device, the electronic device includes a display, a user interface and a near-field ("NFC") communication interface; the electronic device operated by a second person; and a server; wherein:

responsive to an instruction received via operation of the user interface, the electronic device transmits a request for a list of identifiers of members of an agency to the server;

responsive to the request, the server transmits the list of identifiers to the electronic device, the list includes a plurality of identifiers, each identifier identifies one member of the agency;

the electronic device presents the list on the display;

the electronic device receives an identifier from the recording device via the NFC interface;

responsive to a selection of one identifier from the list, the electronic device assigns the identifier from the recording device to the one identifier selected from the list, the one identifier selected from the list via operation of the user interface, the one identifier associated with the first person, whereby the recording device is assigned to the first person;

the electronic device transmits an information to the server regarding the assignment of the identifier from the recording device to the one identifier selected from the list;

the server receives the recorded data from the recording device; and the server associates the recorded data with the first person in accordance with the information regarding the assignment of the identifier from the recording device to the one identifier selected from the list.

14. The system of claim 13 wherein selection of the one identifier from the list via operation of the user interface is responsive to visual verification of an identity of the first person by the second person.

15. The system of claim 13 wherein selection of the one identifier from the list via operation of the user interface is responsive to verification of an identity of the first person via swiping of an identification card of the first person.

16. The system of claim 13 further comprising the recording device, wherein the recording device comprises at least one of a camera, a holster, and a conducted electrical weapon.

17. The system of claim 13 wherein the recording device transmits the recorded data to the server for storage.

* * * * *